July 15, 1924.

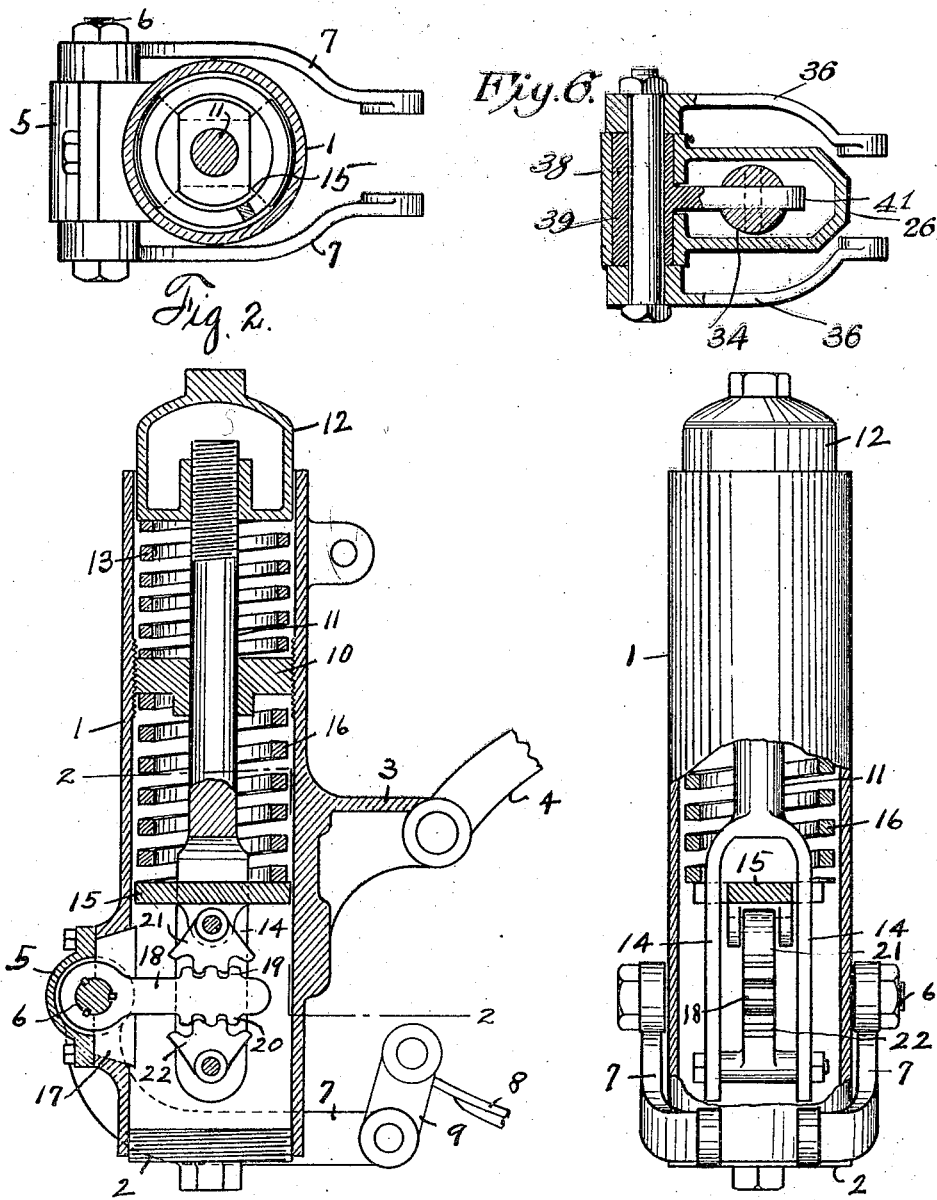

W. H. WHISLER

SHOCK ABSORBER

Filed Nov. 28, 1922

Patented July 15, 1924.

1,501,382

UNITED STATES PATENT OFFICE.

WILLIAM H. WHISLER, OF HOUSTON, TEXAS.

SHOCK ABSORBER.

Application filed November 28, 1922. Serial No. 603,828.

*To all whom it may concern:*

Be it known that I, WILLIAM H. WHISLER, citizen of the United States, residing at Houston, in the county of Harris and State of Texas, have invented certain new and useful Improvements in Shock Absorbers, of which the following is a specification.

This invention relates to new and useful improvements in shock absorbers.

One object of the invention is to provide a shock absorber of the character described specially adapted for application to motor vehicles to absorb the shock incident to the movements of the vehicle over rough roads.

Another object of the invention is to provide a shock absorber embodying a yieldable member which receives the shock and the resistance of which automatically increases as said member is placed under compression.

Another object of the invention is to provide a shock absorber which is of very simple construction and effective in operation and which may be cheaply and easily constructed or repaired.

With the above and other objects in view the invention has particular relation to certain novel features of construction, operation and arrangement of parts, an example of which is given in this specification and illustrated in the accompanying drawings, wherein:—

Figure 1 is a vertical sectional view of the device.

Figure 2 is a transverse sectional view taken on the line 2—2 of Figure 1.

Figure 3 is a side elevation shown partly in section.

Figure 6 is a transverse sectional view taken on line 6—6 of Fig. 4.

Figure 5:
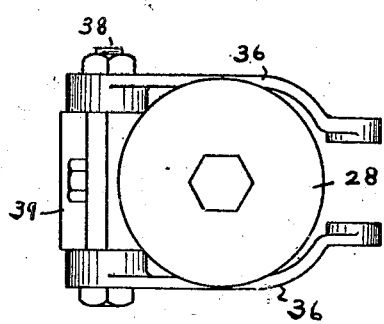
Figure 5 is a plan view thereof.

The invention comprises a resilient cushioning means, an abutment or support therefor, a lever, which may be pivotally mounted on the housing, arranged to act against the resilient means, and a device operatively associated with the lever and resilient cushioning means by which the fulcrum point of the lever against the cushioning means may be changed. In the exemplification illustrated the housing, or a part or member fixed to it, may act as the abutment, and the lever and housing may be connected to relatively movable parts, either of a vehicle or of a machine, device or mechanism, or in whatever situation or location a shock absorber may be applicable. When applied to a vehicle, the housing and lever may be connected to the body and axle, respectively, or vice versa.

In the drawings the numeral 1 designates a tubular housing whose lower end is closed by the plug 2. The housing has a lateral arm 3 for attachment to the vehicle frame 4, and on the opposite side has the bearing 5 in which the shaft 6 rotates. Fixed to the respective ends of said shaft are the arms 7, 7 arranged on opposite sides of the housing, and the free ends of these arms are connected to the vehicle spring 8 by means of the shackle 9. Within the upper end of the housing there is threaded, or otherwise secured, a bearing plate 10. This plate has a central bearing for the rod 11 and threaded onto the upper end of said rod there is a suitable cap 12 which fits snugly within the upper end of the housing, and interposed between said cap and plate there is a rebound spring 13, the same being preferably a coil spring. The lower end of the rod 11 is bifurcated forming the depending fingers 14, 14 and fitted between these fingers there is the bar 15 whose ends are flared to form a support for the coil spring 16 which surrounds the rod 11 and is interposed between said bar and the plate 10. Fastened to the shaft 8 and working through the slot 17 in the side of the housing 1 there is a lever 18 which projects between the fingers 14, and is formed into the upper and lower rack faces 19 and 20 which are in mesh with the respective segmental rack members 21 and 22. The rack member 21 is pivoted to the underside of the bar 15, and the rack member 22 is pivoted between the lower ends of the fingers 14.

As the chassis frame operates the spring there will be a relative upward movement of the arms 7 which will be transmitted through the lever 18 to the bar 15 and the spring 16. As the free end of the lever 18 moves upwardly there will be a corresponding partial rotation of the rack member 21 which will have the effect of moving the point of support toward the free end of said lever with the result that the leverage will be lengthened, thus in effect increasing the resistance of the spring 16, thus the greater the shock, or in other words, the greater the movement of the chassis toward the spring the greater will be the resistance of said spring on account of the lengthened leverage of the lever 18. Both the springs 13 and 16 are placed under tension when the device is assembled and as the spring 16 is placed under compression the resistance of the spring 13 will move the rod 11 upwardly so as to keep the rack member 22 in mesh with the rack 20. Upon rebound the arms 7 will move downwardly relative to the chassis imparting a corresponding downward movement to the lever 18 and a corresponding partial rotation of the rack member 22, thus in effect lengthening the leverage of the lever 18 and making the resistance of the spring 13 more and more effective as said leverage is lengthened, so that the greater the rebound the more will be the resistance offered by the spring 13.

Figure 4:
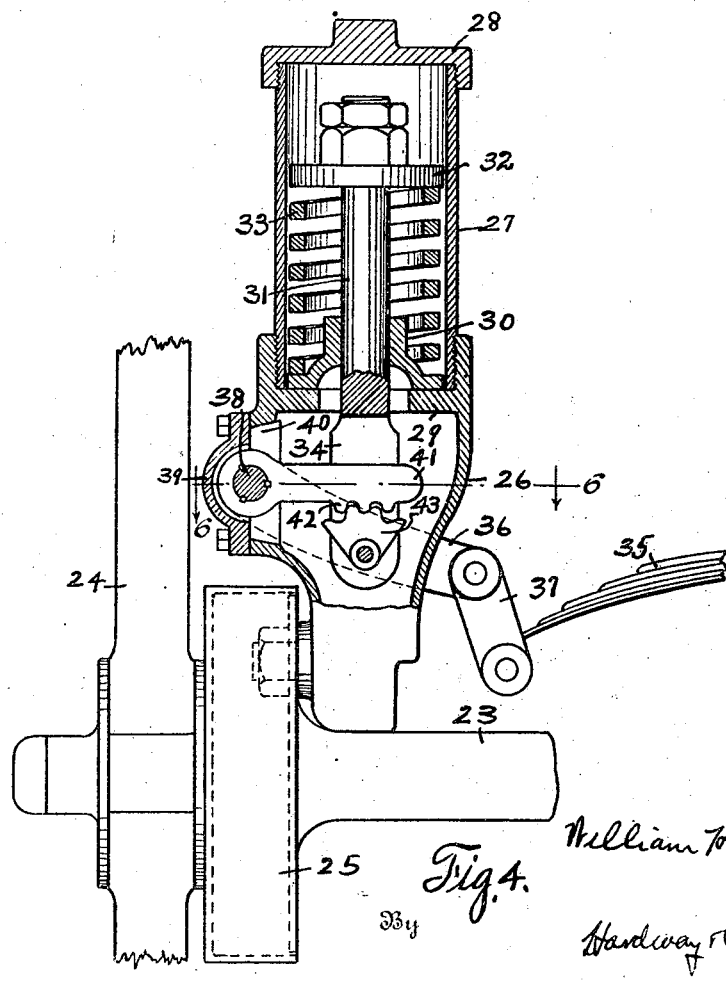
Figure 4 is a vertical sectional view of a modified form of the device.

In Figures 4 and 5 the modified form of the absorber is shown wherein the numeral 23 designates the vehicle axle, the numeral 24 designates the vehicle wheel and the numeral 25 designates the brake drum. Fixed to the drum there is a tubular perch 26 threaded into the upper end of which there is a tubular casing 27 whose upper end is closed by the cap 28 which is threaded thereon, all forming a suitable housing. The perch has an internal annular flange 29 forming a support for the bearing 30 through which the rod 31 slides. The upper end of this rod has a disc like head 32 secured thereon and interposed between the bearing 30 and the head 32 there is a strong coil spring 33. The lower end of this rod is bifurcated forming the fingers 34. The numeral 35 designates the vehicle spring which is attached to the free ends of the arms 36, 36 through the shackle 37. These arms are fixed at their other ends to the shaft 38 which rotates in the bearing 39 carried by the opposite side of said housing. Fixed to said shaft and working through the side slot 40 in the housing there is an arm 41 which works between said fingers and whose lower side is formed into a rack face 42. This rack face is in mesh with the segmental rack 43 which is pivoted between said fingers. A downward shock imparted to the spring 35 will move the arms 36 and the lever 41 downwardly placing the spring 33 under compression thus absorbing the shock and as said lever 41 moves downwardly its point of support on the segmental rack member 43 will move towards the free end of the lever thus lengthening the leverage and increasing the effective resistance of the spring 33. The greater the shock the greater will be the resistance offered by said spring. The type of absorber shown in Figures 4 and 5 is specially adapted for use on Ford automobiles and similar vehicles.

What I claim is:—

1. A shock absorber including in combination with a housing adapted to be attached to a vehicle frame, a lever pivoted to said housing and having an end extended into the housing, and an end adapted to be attached to the vehicle spring, oppositely disposed rack faces on the inwardly extended end of the lever, pivotally mounted rack members in mesh with said respective rack faces and resilient members within the housing operating against said rack members and holding them in mesh with their respective rack faces.

2. A shock absorber including in combination with a housing adapted to be attached to a vehicle frame, a lever pivoted to said housing having an end formed with opposing rack faces and extended into the housing, and an end adapted to be attached to a vehicle spring, a movably mounted member within the housing, segmental racks pivoted to said movably mounted member, said racks being in mesh with said rack faces, and resilient members within the housing forming yieldable seats for said movably mounted member.

3. A shock absorber including in combination with a housing adapted to be attached to a vehicle frame, a lever pivoted to said housing, one end of which works through an opening in the housing and is formed with oppositely disposed rack faces, and the other end of which is adapted to be attached to the vehicle spring, a fixed bearing plate within the housing, resilient members operating against said plate on opposite sides thereof, supporting members seated on said respective resilient members, and rack members pivoted to the respective supporting members and in mesh with the corresponding rack faces.

4. A shock absorber including a housing, a lever pivoted to the housing, one end of which works through an opening thereon, and is formed with oppositely disposed rack faces, segmental rack members pivoted on opposite sides of said rack faces and in mesh therewith, yieldably mounted members to which said rack members are pivoted and resilient members forming seats for said yieldably mounted members.

5. A shock absorber including a housing, a lever pivoted to the housing, one end of which works through an opening thereon, and is formed with oppositely disposed rack faces, segmental rack members pivoted on opposite sides of said rack faces and in mesh therewith, yieldably mounted members to which said rack members are pivoted and resilient members forming seats for said yieldably mounted members, and means through which the other end of said lever may be connected to the vehicle spring.

6. In a shock absorber, a housing, a lever extending into the housing, and having oppositely disposed rack portions, pivotally mounted rack members in mesh with the respective rack portions of the lever, and resilient means within the housing tending to hold the rack members in mesh with their respective lever racks.

7. In a shock absorber, resilient means, a support therefor, a lever acting against said resilient means, the lever and support being adapted to be connected to relatively movable parts, and the lever having oppositely disposed rack portions, and pivotally mounted rack members in mesh with the respective rack portions of the lever and movable with the lever to vary its fulcrum point.

8. In a shock absorber, a spring and a support therefor, a tension device for the spring comprising a member engaging the free end of the spring and an operating rod connected to said spring-engaging member and having an opening therein, a rack member pivotally mounted on the operating rod, and a pivoted lever having a rack face projecting within the opening in the rod and meshing with the pivoted rack member.

9. In a shock absorber, a coil spring and a support therefor, a bifurcated reciprocable rod having a head engaging said spring, a rack member pivotally mounted on said rod between the forks thereof, and a pivoted lever having a rack portion extending between the forks of the rod and meshing with the pivoted rack member, the lever and spring support being adapted to be connected to relatively movable parts.

10. In a shock absorber, a fixed abutment, a coil spring supported on one side of said abutment, a reciprocable rod passing through said fixed abutment and having a head engaging the free end of the spring, a movable abutment slidable on the rod on the other side of the fixed abutment, a coil spring supported between the fixed abutment and the movable abutment, pivoted members carried by said rod and movable abutment respectively, and a pivoted lever projecting between said pivoted members to engage said members.

11. In a shock absorber, a fixed abutment, a coil spring supported on one side of said abutment, a reciprocable rod passing through said fixed abutment and having on one end a head engaging the free end of the spring, the opposite end of the rod being bifurcated, a movable abutment slidably mounted between the forks of the rod, a coil spring supported between the fixed abutment and the movable abutment, rack members pivotally mounted on the rod and the movable abutment, respectively, between the forks of the rod, and a pivoted lever having a rack portion projecting between the pivoted rack members in mesh therewith.

12. In a shock absorber, a housing, a spring supported in said housing, a tension device within the housing comprising a movable abutment engaging the spring and an operating rod connected to said abutment, a rack member pivotally mounted on said rod, and a lever having an arm with a rack face projecting within the housing and meshing with said pivoted rack member.

13. In a shock absorber, a housing, a spring supported in said housing, a movable abutment engaging said spring, an operating rod connected to said abutment, a removable bearing sleeve through which the rod is adapted to slide, a rack member pivoted on said rod, and a lever projecting within the housing and having a rack face meshing with said pivoted rack member.

In testimony whereof I have signed my name to this specification in the presence of two subscribing witnesses.

WILLIAM H. WHISLER.

Witnesses:
W. H. DUNLAY,
E. V. HARDWAY.